E. ATKINSON.
PEAT MACHINE.
No. 62,519. Patented Mar. 5, 1867.
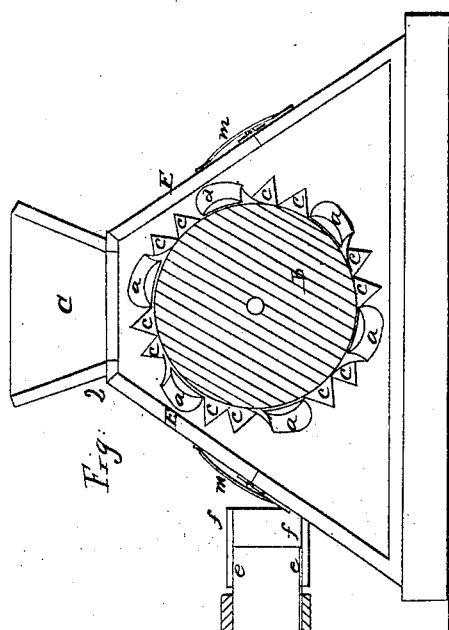
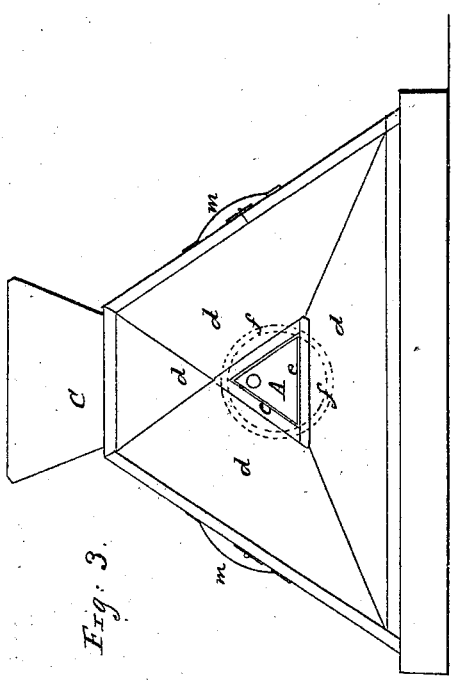
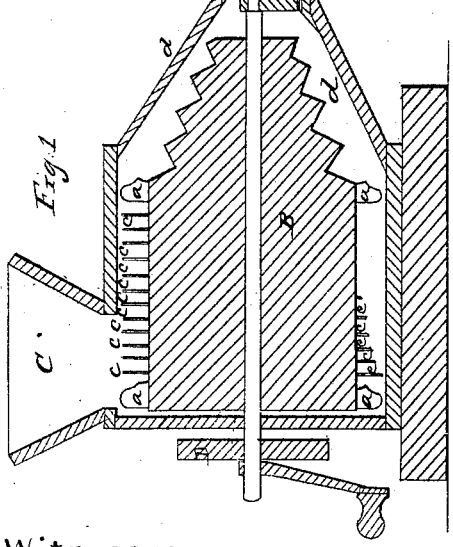
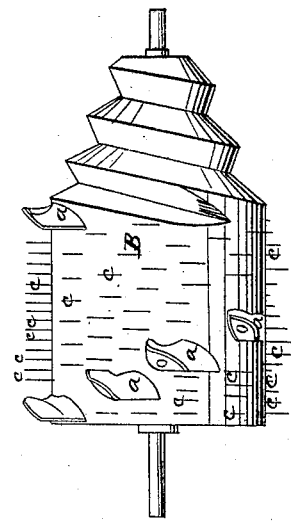
Witnesses:
John E. Crane
Chas. F. Atkinson
Inventor:
Edward Atkinson

United States Patent Office.

EDWARD ATKINSON, OF BROOKLINE, MASSACHUSETTS.

Letters Patent No. 62,519, dated March 5, 1867.

---

IMPROVED PEAT MACHINE.

---

The Schedule referred to in these Letters Patent and making part of the same.

---

TO ALL WHOM IT MAY CONCERN:

Be it known that I, EDWARD ATKINSON, of Brookline, in the county of Norfolk, and State of Massachusetts, have invented certain new and useful improvements in the Machinery or Apparatus which is used for Working, Grinding, or Preparing Peat, of which the following is a full, clear, and exact description, reference being had to the accompanying drawings, making part of this specification, in which—

Figure 1 is a longitudinal vertical section.

Figure 2, a transverse section.

Figure 3, a rear end view; and

Figure 4, a side elevation of the operating cylinder.

My invention consists in the employment of certain plough-shaped cutting and turning blades or mould-boards, $a$, arranged spirally upon and secured to the surface of the cylinder B, and in combination therewith, of certain cutting blades, $c$, which may be arranged between the plough-shaped blades in straight or spiral rows. In combination with these plough-shares and cutting blades, my invention consists in the employment of a deep cut coarse-threaded screw, either fitted to the conical end of the cylinder, or formed in the substance thereof.

My invention also consists in a yielding or an expanding outlet, A, arranged at the rear end of the machine, the yielding sides $e$, of which are made of thin steel plate, or other material which will spring or yield outward, when the ground and prepared or pasty substance is being forced out between said yielding sides. This outlet may be made of some elastic or expanding substance, or tube of like soft rubber, and when the pasty substance is being forced out, the yielding or the expanding outlet will allow the compressed pasty substance to expand as it leaves the outlet, and thereby prevent said substance or prepared peat from cracking, as it would do if the outlet was straight and unyielding. It is exceedingly important to prevent the prepared and compressed peat cracking, for when exposed for drying in the open air, it is liable to be wet by showers of rain, and then the water would run into cracks and very much retard the drying process, and injure the prepared peat.

The rough peat is thrown into the hopper C, the cylinder B rotating by power applied to the pulley D or other device, the plough-shaped blades or plough-shares $a$ cut and turn said rough peat over, and move it along into contact with the blades $c$, which slice, cut, and chop it into small fragments, and as the blades $c$ are cutting and chopping said peat, the plough-shares are turning it over into contact with other cutting blades along the straight portion of the cylinder, where the plough-shares nearest the screw turn the substance over and push it along into contact with the coarse threads of the screw, which jam, mash, press, and force said substance or peat along the inclines or angular sides $d$ of the case, and out at the rear end between the yielding sides $e$ of the outlet, or through an expanding tube, $f$. By this operation of the plough-shares and cutting blades, the rough peat is pressed, cut, jammed, and recut to a considerable degree of fineness, along the straight portion of the cylinder, which cylinder may be of any suitable length to contain the requisite number of plough-shares and cutting blades to perform the operation in a satisfactory manner; and by the operation of the coarse screw, the cut and jammed substance is ground, crushed, and mashed to a pasty condition and forced out through the yielding or expanding outlet, in the proper form to be dried for use. It will be observed that the doors E may be opened by releasing the springs $m$, which hold them against any hard bunches or uncut substance, but give way to allow such bunchy substance to pass, if caught on either of the plough-shares or blades.

I am aware that a screw has been used for grinding or preparing peat, and that a fixed and permanent or stationary and unyielding outlet, or delivery having a flaring end, has been used to prevent prepared peat cracking. I am also aware that a rotating conical screw in combination with a conical straining vessel, has been used for separating the decomposed from the fibrous portion of peat. Therefore I wish it to be distinctly understood that I disclaim having invented the equivalent, in principle or operation, of either of the above-named devices; but what I do claim as new, and desire to secure by Letters Patent, is—

1. The combination of plough-shares $a$, cutting blades $c$, and conical screw, constructed and arranged to operate substantially as and for the purpose set forth.

2. The yielding or expanding outlet or delivery tube, arranged to operate substantially as and for the purpose set forth.

EDWARD ATKINSON.

Witnesses:
JOHN E. CRANE,
CHAS. F. ATKINSON.